United States Patent
Gopalan et al.

(10) Patent No.: US 9,614,606 B2
(45) Date of Patent: Apr. 4, 2017

(54) METHOD AND APPARATUS FOR POWER AWARE RECEIVE DIVERSITY CONTROL

(75) Inventors: Ravi Gopalan, San Diego, CA (US);
Varsha S. Rao, San Diego, CA (US);
Sitaramanjaneyulu Kanamarlapudi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 344 days.

(21) Appl. No.: 13/542,288

(22) Filed: Jul. 5, 2012

(65) Prior Publication Data

US 2013/0170416 A1 Jul. 4, 2013

Related U.S. Application Data

(60) Provisional application No. 61/581,047, filed on Dec. 28, 2011.

(51) Int. Cl.
*H04W 52/02* (2009.01)
*H04B 7/08* (2006.01)

(52) U.S. Cl.
CPC .................. *H04B 7/0877* (2013.01)

(58) Field of Classification Search
CPC .. H04W 52/02; H04W 52/0203; H04W 84/12
See application file for complete search history.

(56) References Cited

U.S. PATENT DOCUMENTS

| 4,866,421 A * | 9/1989 | Szczepanek ........ H04L 12/4625 340/9.1 |
| 7,463,704 B1 * | 12/2008 | Tehrani et al. ............... 375/345 |
| 7,925,302 B2 | 4/2011 | Ulupinar et al. |

(Continued)

FOREIGN PATENT DOCUMENTS

| EP | 0502566 A1 | 9/1992 |
| EP | 1263179 A1 | 12/2002 |

(Continued)

OTHER PUBLICATIONS

International Search Report and Written Opinion—PCT/US2012/071056—ISA/EPO—Apr. 12, 2013.

(Continued)

*Primary Examiner* — Hassan Phillips
*Assistant Examiner* — Prenell Jones
(74) *Attorney, Agent, or Firm* — Darren M. Simon

(57) ABSTRACT

While a user equipment (UE) is in a connected mode, the UE may receive only a limited quantity of data. During this phase, a receive diversity configuration may not be enabled, in an effort to conserve power on the UE side. However, in marginal signal conditions and a poor radio environment, downlink performance at the UE side may be enhanced by enabling receive diversity, irrespective of the limited data received by the UE. However, while receive diversity may improve the signal-to-noise ratio (SNR) at the UE end in marginal signal conditions, the UE may also incur a penalty on power consumption. Therefore, certain aspects of the present disclosure provide techniques for dynamically controlling the receive diversity of a wireless device to improve the downlink procedure performance, while minimizing power consumption due to the usage of a second receive chain when in connected mode.

21 Claims, 6 Drawing Sheets

(56) References Cited

U.S. PATENT DOCUMENTS

| | | | |
|---|---|---|---|
| 8,060,129 B2* | 11/2011 | Grob | H04W 52/06 370/318 |
| 9,036,600 B2* | 5/2015 | Pani | H04W 36/0055 370/331 |
| 2003/0174675 A1* | 9/2003 | Willenegger et al. | 370/335 |
| 2003/0235252 A1* | 12/2003 | Tellado et al. | 375/259 |
| 2004/0253955 A1 | 12/2004 | Love et al. | |
| 2006/0084461 A1* | 4/2006 | Sekiya | H04B 7/0693 455/522 |
| 2007/0127609 A1 | 6/2007 | Kawada et al. | |
| 2007/0281653 A1* | 12/2007 | Haub | H03D 3/007 455/266 |
| 2008/0025264 A1* | 1/2008 | Willenegger | H04B 7/022 370/333 |
| 2008/0151871 A1 | 6/2008 | Parts et al. | |
| 2008/0159373 A1 | 7/2008 | Taha et al. | |
| 2008/0227405 A1* | 9/2008 | Harel et al. | 455/69 |
| 2008/0313519 A1 | 12/2008 | Tseng | |
| 2009/0325501 A1* | 12/2009 | Somasundaram et al. | 455/67.11 |
| 2010/0273517 A1* | 10/2010 | Pinheiro | H04B 1/036 455/522 |
| 2011/0044300 A1* | 2/2011 | Joshi | H04W 88/06 370/336 |
| 2011/0117973 A1* | 5/2011 | Asrani | H04W 52/245 455/571 |
| 2011/0126215 A1 | 5/2011 | Fuks et al. | |
| 2011/0249663 A1* | 10/2011 | Wolf et al. | 370/344 |
| 2012/0023189 A1* | 1/2012 | Giaretta | H04W 48/18 709/217 |
| 2012/0076011 A1 | 3/2012 | Gobriel et al. | |
| 2012/0194239 A1* | 8/2012 | Jang | G11C 7/222 327/158 |
| 2012/0287815 A1 | 11/2012 | Attar | |
| 2013/0148642 A1* | 6/2013 | Abraham | H04W 8/005 370/338 |
| 2015/0071265 A1* | 3/2015 | Marinier | H04L 47/36 370/336 |

FOREIGN PATENT DOCUMENTS

| | | |
|---|---|---|
| EP | 2037590 A1 | 3/2009 |
| EP | 2369758 A1 | 9/2011 |
| JP | H0567995 A | 3/1993 |
| JP | 2003032146 A | 1/2003 |
| JP | 2006246364 A | 9/2006 |
| JP | 2007158515 A | 6/2007 |
| JP | 2008503175 A | 1/2008 |
| JP | 2008312206 A | 12/2008 |
| WO | 2005122441 A1 | 12/2005 |
| WO | 2007122871 A1 | 11/2007 |
| WO | 2010062140 A2 | 6/2010 |

OTHER PUBLICATIONS

Universal Mobile Telecommunications System (UMTS), Physical layer procedures (FDD), (3GPP TS 25.214 version 10.5.0 Release 10), ETSI TS 125 214 V10.5.0 (Jan. 2012), 3GPP TS 25.214 V10.5.0 Rel-10, 102 pages.

* cited by examiner

METHOD AND APPARATUS FOR POWER AWARE RECEIVE DIVERSITY CONTROL

CROSS-REFERENCE TO RELATED APPLICATION

This application claims priority to U.S. Provisional Application Ser. No. 61/581,047, entitled "METHOD AND APPARATUS FOR POWER AWARE RECEIVE DIVERSITY CONTROL", filed on Dec. 28, 2011, which is expressly incorporated by reference herein in its entirety.

BACKGROUND

Field

Certain aspects of the present disclosure generally relate to wireless communications and, more particularly, to a method and apparatus for improving downlink performance in a wireless network.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

Transceivers with multiple antennas may implement any of various suitable diversity schemes in an effort to increase the reliability of transmitted messages through the use of two or more communication channels with different characteristics. Because individual channels may experience different levels of interference and fading, such diversity schemes may reduce the effects of co-channel interference and fading, as well as avoid error bursts.

One type of diversity scheme utilizes space diversity, where a signal may traverse different propagation paths. In the case of wireless transmission, space diversity may be achieved through antenna diversity using multiple transmitting antennas (transmit diversity) and/or multiple receiving antennas (receive diversity). By using two or more antennas, multipath signal distortion may be eliminated, or at least reduced. In the case of receive diversity with two antennas, the signal from the antenna with the least noise (e.g., highest signal-to-noise ratio (SNR)) is typically selected, while the signal from the other antenna is ignored. Some other techniques use the signals from both antennas, combining these signals for enhanced receive diversity.

SUMMARY

Certain aspects of the present disclosure provide a method for wireless communications. The method generally includes detecting, in a first receive chain, a triggering event for enabling a second receive chain during downlink transmissions, enabling the second receive chain based on the triggering event, and disabling at least a portion of the second receive chain after a duration.

Certain aspects of the present disclosure provide an apparatus for wireless communications. The apparatus generally includes means for detecting, in a first receive chain, a triggering event for enabling a second receive chain during downlink transmissions, means for enabling the second receive chain based on the triggering event, and means for disabling at least a portion of the second receive chain after a duration.

Certain aspects of the present disclosure provide an apparatus for wireless communications. The apparatus generally includes at least one processor and a memory coupled to the at least one processor. The at least one processor is generally configured to detect, in a first receive chain, a triggering event for enabling a second receive chain during downlink transmissions, enable the second receive chain based on the triggering event, and disable at least a portion of the second receive chain after a duration.

Certain aspects of the present disclosure provide a computer-program product for wireless communications. The computer-program product generally includes a computer-readable medium having code for detecting, in a first receive chain, a triggering event for enabling a second receive chain during downlink transmissions, enabling the second receive chain based on the triggering event, and disabling at least a portion of the second receive chain after a duration.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
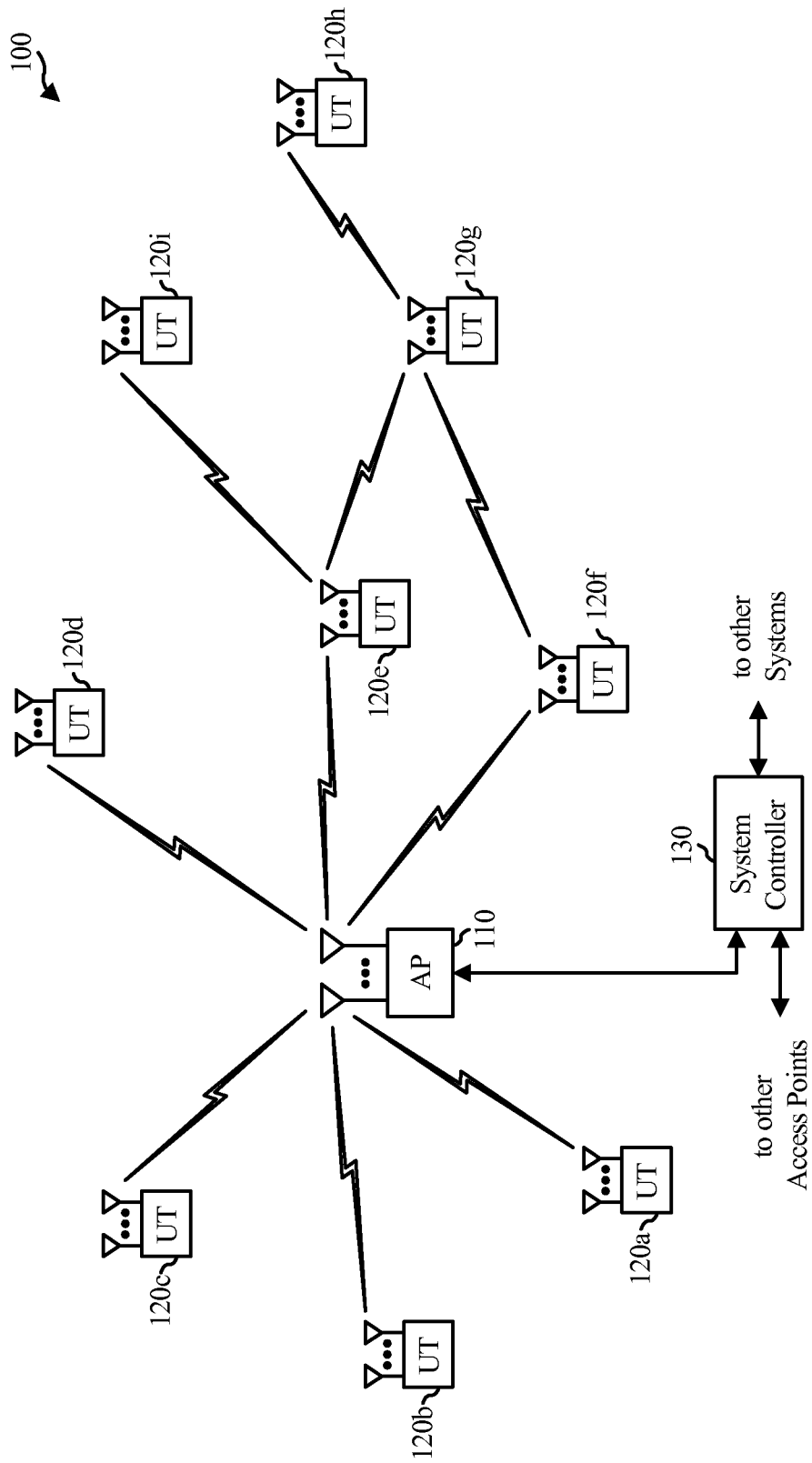
FIG. 1 illustrates a diagram of a wireless communications network in accordance with certain aspects of the present disclosure.

While a user equipment (UE) is in a connected mode, the UE may receive only a limited quantity of data. During this phase, a receive diversity configuration may not be enabled, in an effort to conserve power on the UE side. However, in marginal signal conditions and a poor radio environment, downlink performance at the UE side may be enhanced by enabling receive diversity, irrespective of the limited data received by the UE. However, while receive diversity may improve the signal-to-noise ratio (SNR) at the UE end in marginal signal conditions, the UE may also incur a penalty on power consumption. Therefore, certain aspects of the present disclosure provide techniques for dynamically controlling the receive diversity of a wireless device to improve the downlink procedure performance, while minimizing power consumption due to the usage of a second receive chain when in connected mode.

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different wireless technologies, system configurations, networks and transmission protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain embodiments of the techniques are described below for LTE, and LTE terminology is used in much of the description below.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as Node B, Radio Network Controller ("RNC"), evolved Node B ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as user equipment (UE), a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more embodiments taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system device, or any other suitable device that is configured to communicate via a wireless or wired medium. In some embodiments, the node is a wireless node. Such wireless node may provide, for example, connectivity for or to a network (e.g., a wide area network such as the Internet or a cellular network) via a wired or wireless communication link.

FIG. 1 illustrates a wireless communications system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

Figure 2:
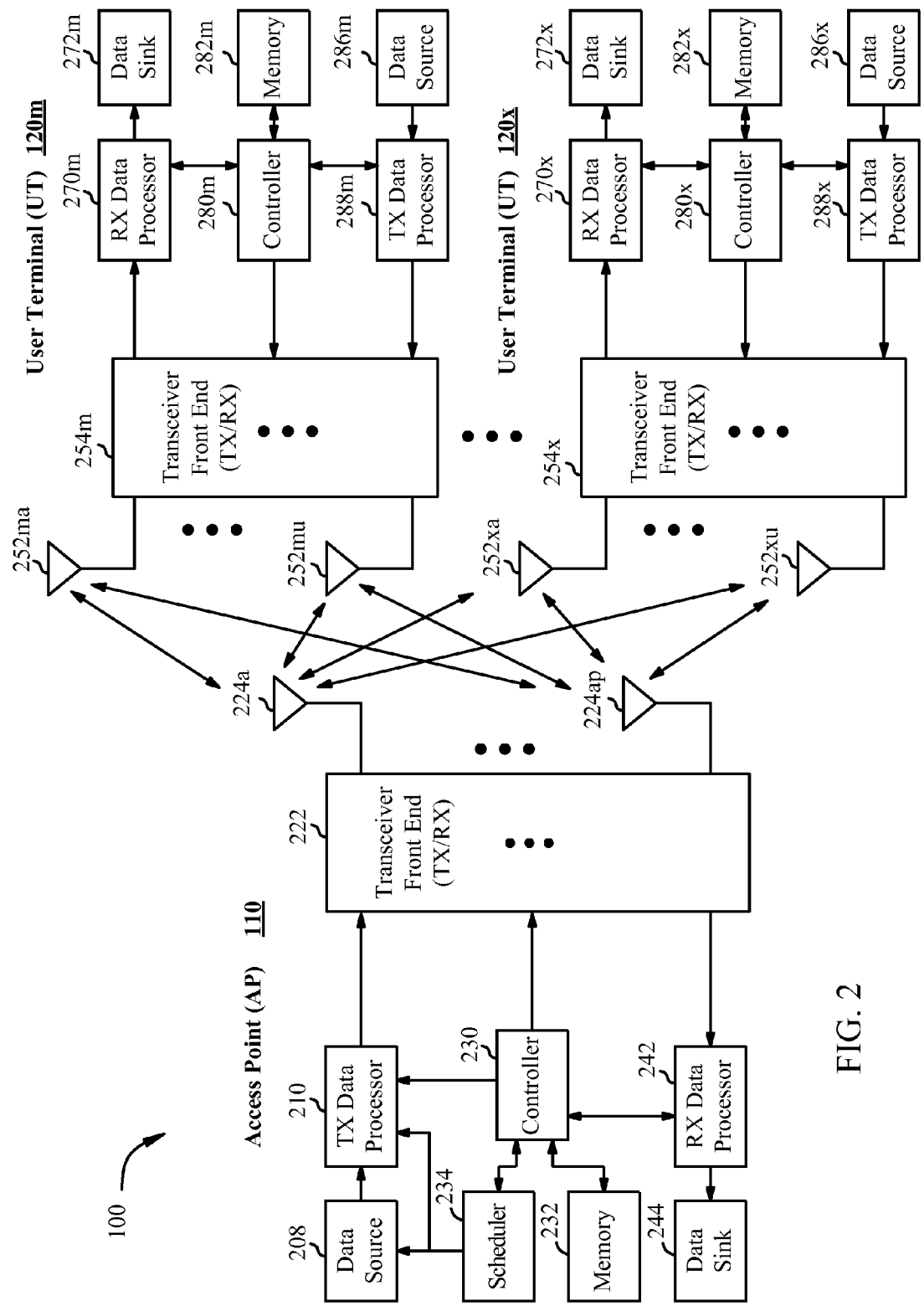
FIG. 2 illustrates a block diagram of an example access point (AP) and user terminals in accordance with certain aspects of the present disclosure.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254.

A number $N_{up}$ of user terminals may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. For certain aspects of the present disclosure, the signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222.

At each user terminal 120, $N_{ut,m}$ antennas 252 receive the downlink signals from access point 110. For receive diversity at the user terminal 120, the transceiver front end 254 may select signals received from one of the antennas 252 for processing. For certain aspects of the present disclosure, the signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Those skilled in the art will recognize the techniques described herein may be generally applied in systems utilizing any type of multiple access schemes, such as SDMA, OFDMA, CDMA, SDMA, and combinations thereof.

Figure 3:
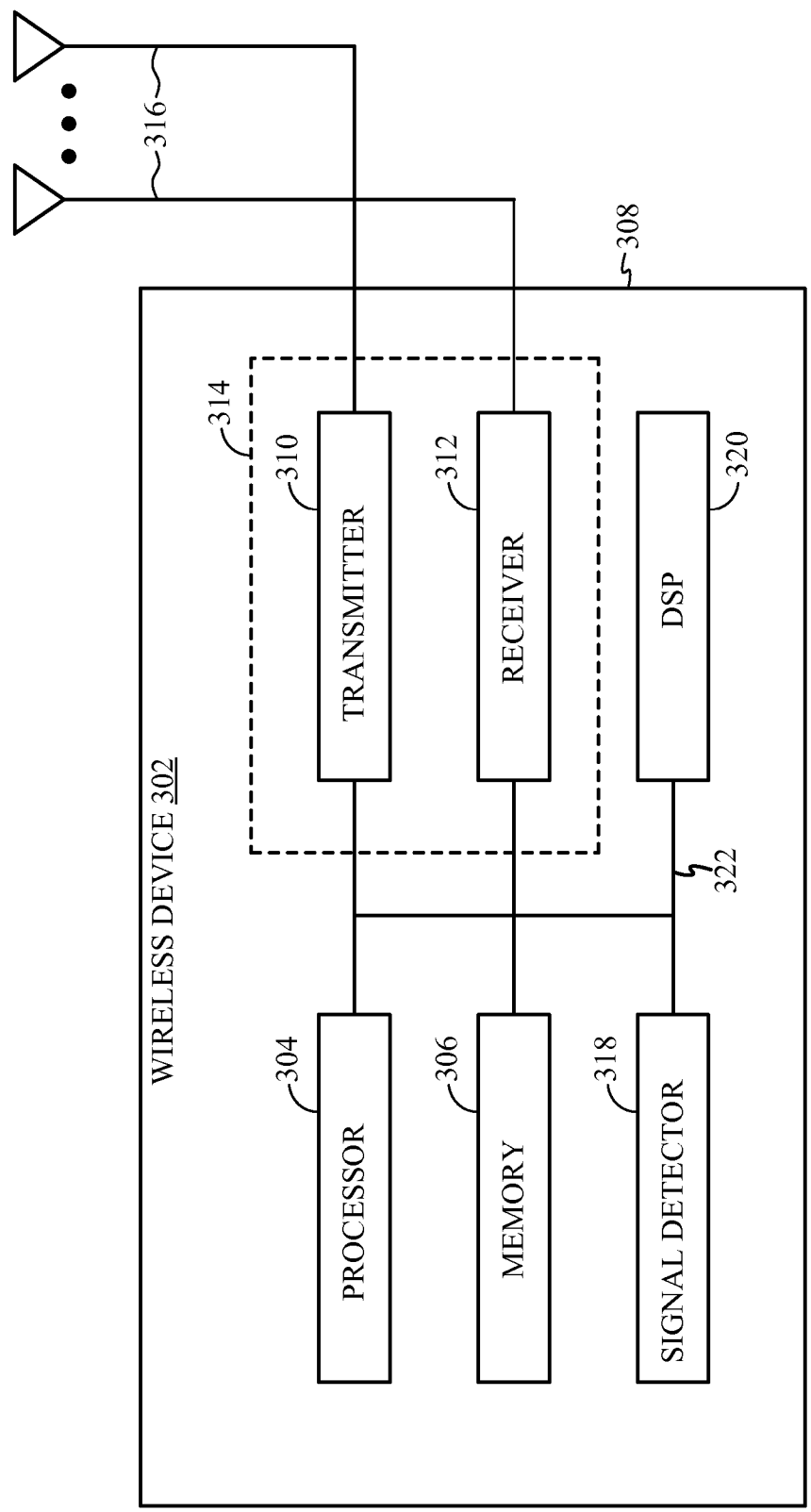
FIG. 3 illustrates a block diagram of an example wireless device in accordance with certain embodiments of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 110 from FIG. 1 or any of the user terminals 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

For certain aspects of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH) and Broadband Pilot Channel (BPICH).

In an embodiment, a channel structure is provided (at any given time, the channel is contiguous or uniformly spaced in frequency) that preserves low PAPR properties of a single carrier waveform.

Frequency domain orthogonality of OFDM signals transmitted from different transmitters (e.g., base stations) may be dependent on time synchronization at a receiver (e.g., a mobile station). If a time offset between two of the transmitted OFDM signals is greater than a cyclic prefix (CP), then frequency domain orthogonality between these OFDM signals may be lost. The loss of orthogonality may be even worsened in multi-path scenarios.

Example Power Aware Receive Diversity Control

In wireless networks, a user equipment (UE) may be in a connected mode but not in a dedicated mode. For example, in the forward access channel (FACH) mode, the UE may not have a dedicated connection to a wireless network. While the UE is in a connected mode, the UE may receive only a limited quantity of data. During this phase, a receive diversity configuration (e.g., utilizing multiple receive chains/antennas for a single signal path) may not be enabled, in an effort to conserve power on the UE side. Moreover, the gain in signal-to-noise ratio (SNR) achieved due to receive diversity may not be a considerable amount, due to the nature of limited data received by the UE. However, in marginal signal conditions and a poor radio environment, downlink performance at the UE side (especially signaling procedures) may be enhanced by enabling receive diversity, irrespective of the limited data received by the UE. However, while receive diversity may improve the SNR at the UE end in marginal signal conditions, the UE may also incur a penalty on power consumption.

In marginal signal conditions and a poor radio environment, a UE in a non-dedicated mode may experience poor signaling procedure performance, as described above. This may lead to radio link control (RLC) unrecoverable errors or random access channel (RACH) message transmission failures, which may consequently lead to frequent cell reselection and cell update procedures. For example, there may be increases in the signaling load on the wireless network with greater traffic from the UE, due to frequent cell updates and other procedures initiated by the UE. Moreover, there may be increases in the usage of common resources like physical RACH (PRACH) and associated interference experienced by the system. As another example, there may be increases in the power draw on the UE side due to frequent cell reselection.

Certain aspects of the present disclosure provide techniques for dynamically controlling the receive diversity of a dual antenna mechanism (e.g., on the UE side) to improve the downlink procedure performance, while keeping the power consumption increase due to the usage of a second receive chain to a minimum (or at least reducing the increased power consumption due to the second receive chain). In other words, dynamically controlling the receive diversity may achieve greater reliability in decoding downlink data sent by the network, while keeping power consumption at a minimum. Although dynamic controlling of a dual antenna mechanism is further discussed, aspects of the present disclosure may also apply to wireless devices with a plurality of antennas.

Figure 4:
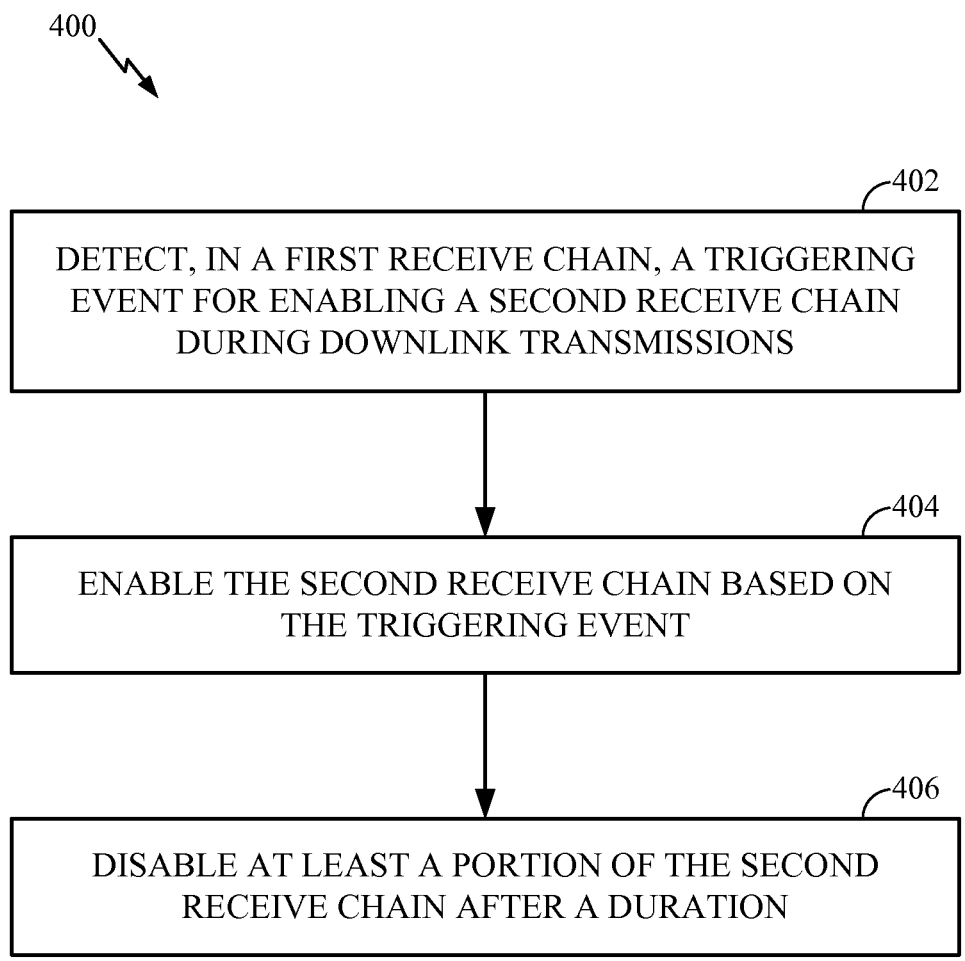
FIG. 4 illustrates example operations for wireless communications, in accordance with certain aspects of the present disclosure.

FIG. 4 illustrates example operations 400 for dynamically controlling receive diversity, in accordance with certain aspects of the present disclosure. The operations 400 may be performed, for example, by a UE. At 402, the UE may detect, in a first receive chain, a triggering event for enabling a second receive chain during downlink transmissions. For example, a UE-triggered mechanism may enable and disable the receive diversity (RxD) in a dynamic manner. At 404, the UE may enable the second receive chain based on the triggering event (e.g., another signal path that enables the UE to receive two streams of a signal). At 406, the UE may disable at least a portion of the second receive chain after a duration.

For certain aspects, the triggering event may be based on a radio resource control (RRC) signaling procedure that results in the downlink transmissions, wherein a duration of the RRC signaling procedure may be known. On initiation of the RRC signaling procedure, RRC may be aware if the initiated procedure results in the UE receiving data on the downlink. In addition, RRC may have knowledge of the time frame during which the UE is expected to receive the data. RRC, therefore, may indicate the duration for which RxD may be enabled, in an effort to reliably decode the data sent by the network. Upon expiration of the predetermined duration, at least a portion of the RxD may be disabled, in an effort to minimize power consumption.

For certain aspects, the triggering event may be based on radio link control (RLC) data activity. On initiation of the transmission of data protocol data units (PDUs) from the RLC level (e.g., on a data path like packet data convergence protocol (PDCP)/DS), RLC may be aware of the expected response time for an uplink transmission (e.g., status PDU transmitted from the UE for acknowledged mode (AM) PDUs). RLC, therefore, may indicate the duration for which RxD may be enabled. For example, RxD may enable the second receive chain upon the initiation of the transmission of data PDUs from the RLC level, and disable at least a portion of the second receive chain at or before the expected response time for the uplink transmission from the UE.

Figure 5A:
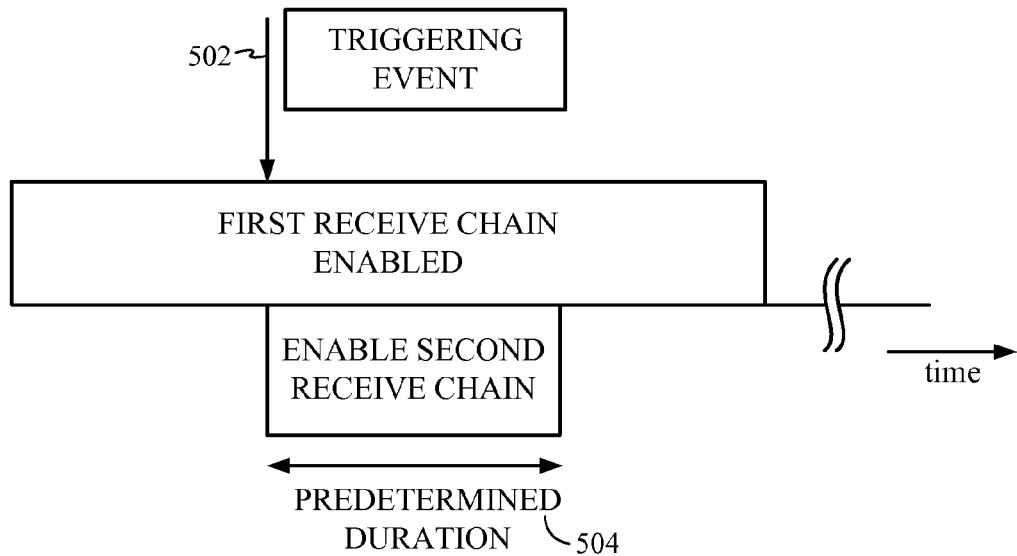
FIGS. 5A-B illustrate timelines for enabling and disabling a second receive chain of a UE during downlink transmissions, in accordance with certain aspects of the present disclosure.

FIG. 5A illustrates a timeline for enabling a second receive chain of a UE for a predetermined duration during downlink transmissions, in accordance with certain aspects of the present disclosure. At 502, the UE may detect, in a first receive chain, a triggering event for enabling a second receive chain during downlink transmissions. As described above, a predetermined duration 504 for enabling the second receive chain may be indicated by an RRC signaling procedure or RLC data activity. Upon termination of the duration 504, the second receive chain may be disabled.

When the UE is in connected mode, data received by the UE may be sent on a secondary common control physical channel (SCCPCH). The SCCPCH slot format employed may have a fixed location for transport format combination indicator (TFCI) and pilot bits. For certain aspects, detecting the triggering event generally includes comparing an energy of symbols corresponding to the TFCI bits (e.g., accumulated on a per slot basis) against a threshold value, and detecting the triggering event upon the energy of the symbols exceeding the threshold value. When the network schedules downlink data intermittently, the energy of the demodulated symbols corresponding to the TFCI/pilot bits may be compared against a threshold arrived at heuristically, and a downlink transmission from the data on the SCCPCH may, therefore, be detected and RxD can be enabled. For certain aspects, the threshold value generally includes an absolute energy metric of the symbols (e.g., of the accumulated symbols over a slot and a certain number of slots). Disabling at least the second receive chain generally includes further detecting the energy of the symbols no longer exceeds the threshold value.

Figure 5B:
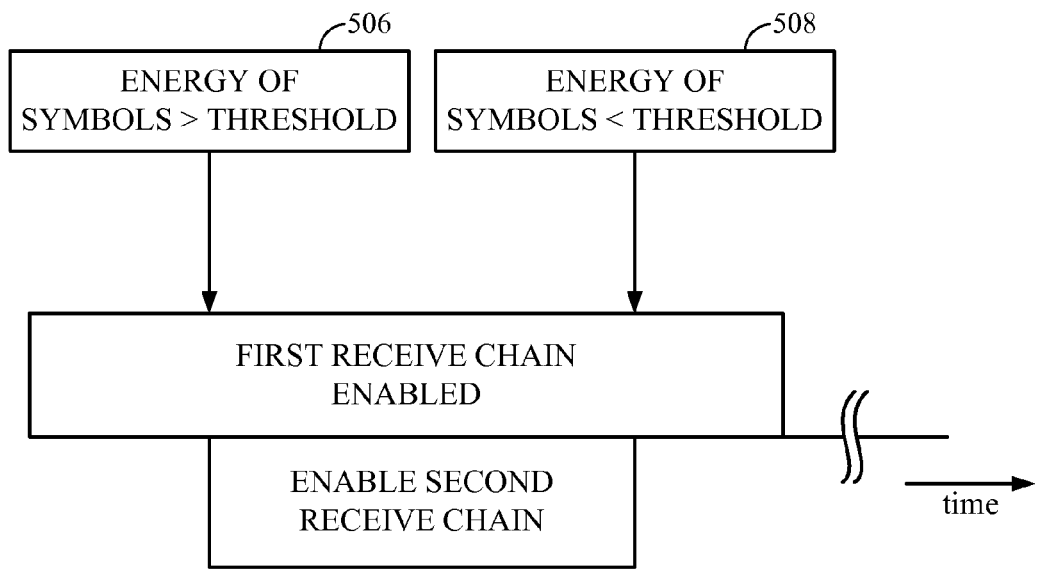

FIG. 5B illustrates a timeline for enabling and disabling a second receive chain of a UE during downlink transmissions, in accordance with certain aspects of the present disclosure. As described above, the UE may compare an energy of symbols against a threshold value, and detect the triggering event upon the energy of the symbols exceeding the threshold value (at 506), possibly indicating the detection of downlink transmissions. Thereafter, the second receive chain may be enabled during the downlink transmissions. After a period of time, the UE may detect that the energy of the symbols no longer exceeds the threshold value (at 508), possibly indicating an end to the downlink transmissions. As a result, the second receive chain may be disabled.

Enabling and disabling the second receive chain (i.e., diversity antenna) generally involves a multitude of components, and can result in latencies if dynamic toggling is enabled. For example, enabling of the second receive chain for signal reception generally includes a number of steps with each of them taking a finite amount of time to complete. Aspects of the present disclosure provide techniques for minimizing processing overhead to enable/disable the second receive chain.

For certain aspects, the latencies may be overcome by keeping the RxD in a low power mode. For example, upon configuring the second receive chain, the phase-locked loop (PLL) driving the second receive chain may be turned off. In other words, upon detecting a triggering event, enabling and disabling at least the portion of the second receive chain generally includes toggling the PLL (e.g., a source clock) of the second receive chain. For example, disabling at least the portion of the second receive chain generally includes enabling the low power mode, wherein the source clock of the second receive chain is disabled. For certain aspects, low power mode signifies that all configurations made to the hardware and all state machines in the software/firmware are saved. However, the source clock that drives the hardware for data reception is toggled off. The second receive chain may therefore be enabled for symbol augmentation with the first receive chain in the downlink path in a short span of time.

Certain aspects of the present disclosure provide an improved DL SIR/SINR at the receiver front, with a dual antenna mechanism using RxD. This results in improved downlink performance at the UE side with a minimal increase in power consumption due to the dynamic toggling of the second receive chain. Therefore, improved downlink performance may reduce the power requirements at the UE. For example, improved acquisition indication channel (AICH) decoding may reduce the number of preambles. As each successive preamble may increase the transmitted power by power ramp step and also may increase the power requirement for the message part, improved AICH performance may result in decreased overall power requirements on the UE side.

Further, improved downlink performance may decrease the number of RLC level retransmissions in DL, during the poor radio conditions and avoid a possible RLC reset and unrecoverable errors. For example, in WCDMA, signaling radio bearer (SRB) messages may have maxRST set as 1, which means any trigger for reset may result in an RLC unrecoverable error. Improved downlink performance may obviate the need for cell reselections due to RLC unrecoverable errors, thereby, reducing the load on the signaling path and associated interference in the overall system. Also, improved downlink performance in non-dedicated mode may become vital with the presence of high speed (HS)-RACH and HS-FACH.

Figure 4A:
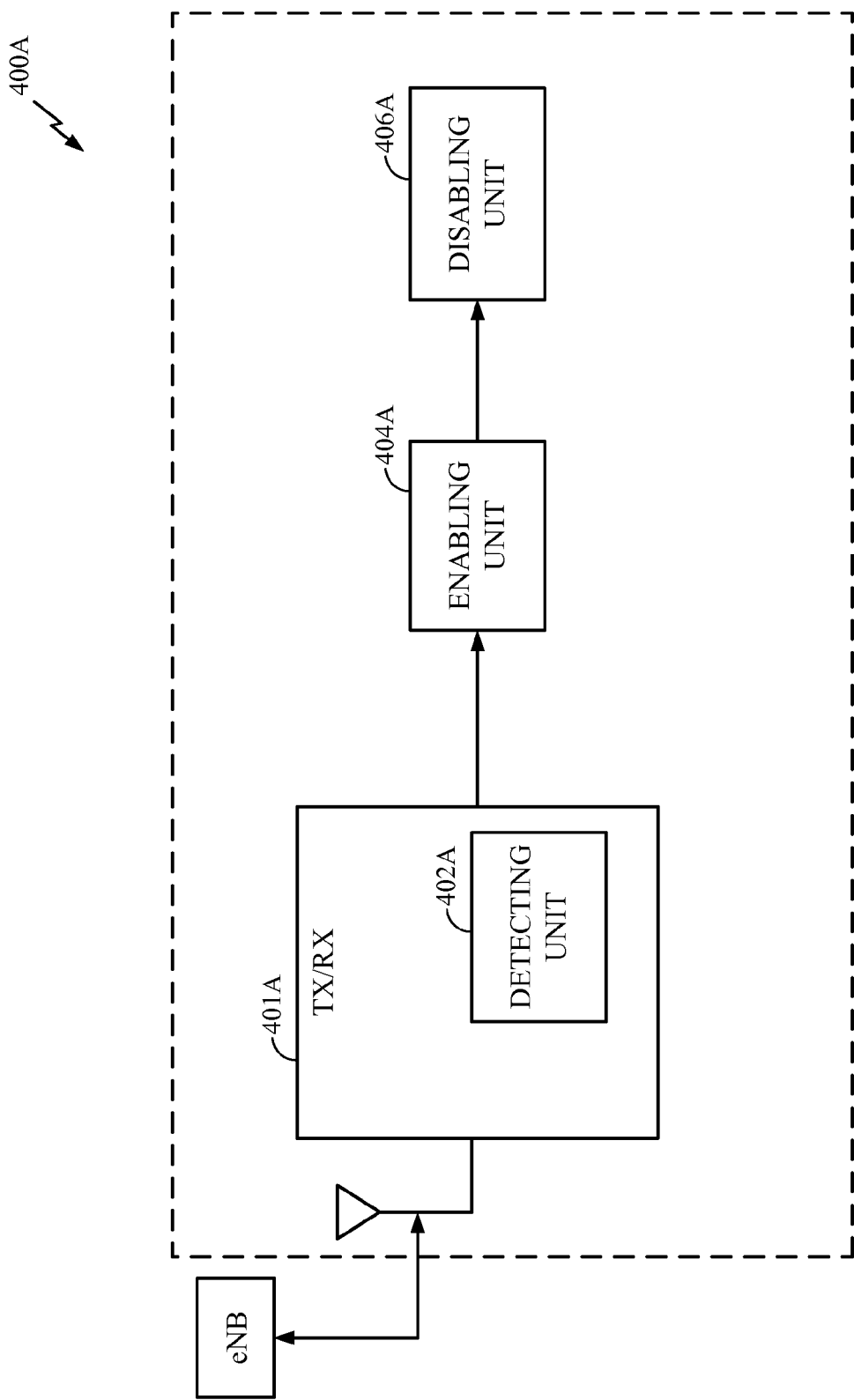
FIG. 4A illustrates example components capable of performing the operations illustrated in FIG. 4.

The operations 400 described above may be performed by any suitable components or other means capable of performing the corresponding functions of FIG. 4. For example, operations 400 illustrated in FIG. 4 correspond to components 400A illustrated in FIG. 4A. In FIG. 4A, a transceiver (TX/RX) 401A may receive a signal at one or more receiver antennas. A detecting unit 402A of the TX/RX 401A may detect, in a first receive chain, a triggering event for enabling a second receive chain during downlink transmissions. An enabling unit 404A may enable the second receive chain based on the triggering event. A disabling unit 406A may disable at least a portion of the second receive chain after a duration.

The various operations of methods described above may be performed by any suitable means capable of performing the corresponding functions. The means may include various hardware and/or software component(s) and/or module (s), including, but not limited to a circuit, an application specific integrated circuit (ASIC), or processor.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
   receiving, in a first receive chain, data;
   detecting, in the first receive chain based on the received data, a triggering event for enabling a second receive chain during downlink transmissions, wherein the first receive chain and the second receive chain each comprises an antenna, and wherein the triggering event comprises detecting that an energy of symbols of the received data exceeds a threshold value;
   enabling the second receive chain based on the triggering event; and
   disabling at least a portion of the second receive chain after a duration, wherein the duration is indicated by the triggering event.

2. The method of claim 1, wherein the triggering event is based on a radio resource control (RRC) signaling procedure that results in the downlink transmissions.

3. The method of claim 1, wherein the triggering event is based on radio link control (RLC) data activity.

4. The method of claim 1, wherein the symbols correspond to transport format combination indicator (TFCI) bits.

5. The method of claim 1, wherein the disabling comprises:
   further detecting the energy of the symbols no longer exceeds the threshold value; and
   disabling at least the portion of the second receive chain upon the further detection.

6. The method of claim 1, wherein enabling and disabling at least the portion of the second receive chain comprises toggling a source clock of the second receive chain.

7. The method of claim 6, wherein disabling at least the portion of the second receive chain comprises enabling a low power mode, wherein the source clock of the second receive chain is disabled.

8. An apparatus for wireless communications, comprising:
   at least one processor configured to:
      receive, in a first receive chain, data;
      detect, in the first receive chain based on the received data, a triggering event for enabling a second receive chain during downlink transmissions, wherein the first receive chain and the second receive chain each comprises an antenna, and wherein the triggering event comprises detecting that an energy of symbols of the received data exceeds a threshold value;
      enable the second receive chain based on the triggering event; and
      disable at least a portion of the second receive chain after a duration, wherein the duration is indicated by the triggering event; and
   a memory coupled to the at least one processor.

9. The apparatus of claim 8, wherein the triggering event is based on a radio resource control (RRC) signaling procedure that results in the downlink transmissions.

10. The apparatus of claim 8, wherein the triggering event is based on radio link control (RLC) data activity.

11. The apparatus of claim 8, wherein the symbols correspond to transport format combination indicator (TFCI) bits.

12. The apparatus of claim 8, wherein the at least one processor configured to disable is further configured to:
   further detect the energy of the symbols no longer exceeds the threshold value; and
   disable at least the portion of the second receive chain upon the further detection.

13. The apparatus of claim 8, wherein the at least one processor configured to enable and disable at least the portion of the second receive chain is further configured to toggle a source clock of the second receive chain.

14. The apparatus of claim 13, wherein the at least one processor configured to disable at least the portion of the second receive chain is further configured to enable a low power mode, wherein the source clock of the second receive chain is disabled.

15. A computer-program product for wireless communications, the computer-program product comprising:
   a non-transitory computer-readable medium having code for:
      receiving, in a first receive chain, data;
      detecting, in the first receive chain based on the received data, a triggering event for enabling a second receive chain during downlink transmissions, wherein the first receive chain and the second receive chain each comprises an antenna, and wherein the triggering event comprises detecting that an energy of symbols of the received data exceeds a threshold value;
      enabling the second receive chain based on the triggering event; and
      disabling at least a portion of the second receive chain after a duration, wherein the duration is indicated by the triggering event.

16. The computer-program product of claim 15, wherein the triggering event is based on a radio resource control (RRC) signaling procedure that results in the downlink transmissions.

17. The computer-program product of claim 15, wherein the triggering event is based on radio link control (RLC) data activity.

18. The computer-program product of claim 15, wherein the symbols correspond to transport format combination indicator (TFCI) bits.

19. The computer-program product of claim 15, wherein the code for disabling comprises code for:
   further detecting the energy of the symbols no longer exceeds the threshold value; and
   disabling at least the portion of the second receive chain upon the further detection.

20. The computer-program product of claim 15, wherein the code for enabling and disabling at least the portion of the second receive chain comprises code for toggling a source clock of the second receive chain.

21. The computer-program product of claim 20, wherein the code for disabling at least the portion of the second receive chain comprises code for enabling a low power mode, wherein the source clock of the second receive chain is disabled.

* * * * *